US008301446B2

(12) United States Patent
Shu (10) Patent No.: US 8,301,446 B2
(45) Date of Patent: Oct. 30, 2012

(54) SYSTEM AND METHOD FOR TRAINING AN ACOUSTIC MODEL WITH REDUCED FEATURE SPACE VARIATION

(75) Inventor: Chang-Qing Shu, Orlando, FL (US)

(73) Assignee: Adacel Systems, Inc., Orlando, FL (US)

( * ) Notice: Subject to any disclaimer, the term of this patent is extended or adjusted under 35 U.S.C. 154(b) by 884 days.

(21) Appl. No.: 12/413,896

(22) Filed: Mar. 30, 2009

(65) Prior Publication Data

US 2010/0250240 A1    Sep. 30, 2010

(51) Int. Cl.
    *G10L 15/00*    (2006.01)
(52) U.S. Cl. .......................................... 704/251; 704/270
(58) Field of Classification Search ................... 704/251, 704/270, 275
    See application file for complete search history.

(56) References Cited

U.S. PATENT DOCUMENTS

| | | | | |
|---|---|---|---|---|
| 5,865,626 | A * | 2/1999 | Beattie et al. ................. | 434/185 |
| 6,085,160 | A * | 7/2000 | D'hoore et al. ............. | 704/256.2 |
| 6,236,965 | B1 * | 5/2001 | Kim et al. ..................... | 704/254 |
| 6,389,394 | B1 * | 5/2002 | Fanty ............................ | 704/249 |
| 6,434,521 | B1 * | 8/2002 | Barnard ........................ | 704/244 |
| 7,113,908 | B2 * | 9/2006 | Goronzy et al. .............. | 704/244 |
| 7,139,708 | B1 * | 11/2006 | Olorenshaw et al. ......... | 704/254 |
| 7,467,087 | B1 * | 12/2008 | Gillick et al. ................. | 704/260 |
| 2002/0111805 | A1 * | 8/2002 | Goronzy et al. .............. | 704/250 |
| 2002/0156627 | A1 * | 10/2002 | Itoh et al. ...................... | 704/254 |
| 2002/0173958 | A1 * | 11/2002 | Asano et al. .................. | 704/251 |
| 2002/0173966 | A1 * | 11/2002 | Henton ......................... | 704/277 |
| 2003/0110035 | A1 * | 6/2003 | Thong et al. .................. | 704/254 |
| 2004/0172247 | A1 * | 9/2004 | Yoon et al. .................... | 704/251 |
| 2004/0176946 | A1 * | 9/2004 | Billa et al. ...................... | 704/10 |
| 2004/0210438 | A1 * | 10/2004 | Gillick et al. ................. | 704/254 |
| 2005/0197835 | A1 * | 9/2005 | Reinhard et al. .............. | 704/249 |
| 2005/0256715 | A1 * | 11/2005 | Okimoto et al. .............. | 704/257 |
| 2006/0224384 | A1 * | 10/2006 | Dow et al. ..................... | 704/257 |
| 2007/0294082 | A1 * | 12/2007 | Jouvet et al. .................. | 704/231 |
| 2009/0024392 | A1 * | 1/2009 | Koshinaka .................... | 704/257 |
| 2010/0145707 | A1 * | 6/2010 | Ljolje et al. ................... | 704/267 |

* cited by examiner

*Primary Examiner* — Jialong He
(74) *Attorney, Agent, or Firm* — Allen, Dyer, Doppelt, Milbrath & Gilchrist, P.A.

(57) ABSTRACT

Feature space variation associated with specific text elements is reduced by training an acoustic model with a phoneme set, dictionary and transcription set configured to better distinguish the specific text elements and at least some specific phonemes associated therewith. The specific text elements can include the most frequently occurring text elements from a text data set, which can include text data beyond the transcriptions of a training data set. The specific text elements can be identified using a text element distribution table sorted by occurrence within the text data set. Specific phonemes can be limited to consonant phonemes to improve speed and accuracy.

26 Claims, 7 Drawing Sheets

| Word | Occ | Occ (%) | Cum Occ (%) |
|---|---|---|---|
| ONE | 10723 | 8.12% | 8.12% |
| TWO | 7499 | 5.68% | 13.80% |
| ZERO | 6318 | 4.79% | 18.59% |
| THREE | 4096 | 3.10% | 21.69% |
| RUNWAY | 3778 | 2.86% | 24.55% |
| FIVE | 3603 | 2.73% | 27.28% |
| SEVEN | 2837 | 2.15% | 29.43% |
| SELECT | 2483 | 1.88% | 31.31% |
| FOUR | 2438 | 1.85% | 33.16% |
| TO | 2437 | 1.85% | 35.01% |
| SIX | 2286 | 1.73% | 36.74% |
| HEADING | 2123 | 1.61% | 38.35% |
| EIGHT | 2114 | 1.60% | 39.95% |
| TAXI | 1866 | 1.41% | 41.36% |
| RIGHT | 1730 | 1.31% | 42.67% |
| LEFT | 1724 | 1.31% | 43.98% |
| FREQUENCY | 1630 | 1.23% | 45.21% |
| NINE | 1530 | 1.16% | 46.37% |
| SPEED | 1410 | 1.07% | 47.44% |
| THOUSAND | 1179 | 0.89% | 48.33% |
| HOLD | 1177 | 0.89% | 49.23% |
| TOWER | 1174 | 0.89% | 50.11% |

| Word | Spelling |
|---|---|
| ZERO | Z IY R OW |
| ONE | W AH N |
| TWO | T UW |
| THREE | TH R IY |
| FOUR | F AO R |
| FIVE | F AY V |
| SIX | S IH K S |
| SEVEN | S EH V AX N |
| EIGHT | EY T |
| NINE | N AY N |

FIG. 5

| Word | Spelling |
|---|---|
| DZERO | DZ IY DR OW |
| DDONE | DW AH DN |
| DTWO | DT UW |
| DTHREE | DTH DR IY |
| DFOUR | DF AO DR |
| DFIVE | DF AY DV |
| DSIX | DS IH DK DS |
| DSEVEN | DS EH DV AX DN |
| DEIGHT | EY DT |
| DNINE | DN AY DN |

FIG. 7

| Phoneme Set | PH₁ | PHs | PHss | PHsr | PHcom |
|---|---|---|---|---|---|
| Phoneme | AA | | | | AA |
| | AE | | | | AE |
| | AH | AH | | | AH |
| | AO | AO | | | AO |
| | AW | | | | AW |
| | AX | AX | | | AX |
| | AY | AY | | | AY |
| | B | | | | B |
| | CH | | | | CH |
| | D | | | | D |
| | DH | | | | DH |
| | EH | EH | | | EH |
| | ER | | | | ER |
| | EY | EY | | | EY |
| | F | F | F | DF | F, DF |
| | G | | | | G |
| | HH | | | | HH |
| | IH | IH | | | IH |
| | IY | IY | | | IY |
| | JH | | | | JH |
| | K | K | K | DK | K, DK |
| | L | | | | L |
| | M | | | | M |
| | N | N | N | DN | N, DN |
| | NG | | | | NG |
| | OW | OW | | | OW |
| | OY | | | | OY |
| | P | | | | P |
| | R | R | R | DR | R, DR |
| | S | S | S | | S, DS |
| | SH | | | | SH |
| | SIL | | | | SIL |
| | T | T | T | DT | T, DT |
| | TH | TH | TH | DTH | TH |
| | UH | | | | UH |
| | UW | UW | | | UW |
| | V | V | V | DV | V, DV |
| | W | W | W | DW | W, DW |
| | Y | | | | Y |
| | Z | Z | Z | DZ | Z, DZ |
| | ZH | | | | ZH |
| Total Number of Phonemes | 41 | 20 | 10 | 10 | 51 |

SYSTEM AND METHOD FOR TRAINING AN ACOUSTIC MODEL WITH REDUCED FEATURE SPACE VARIATION

FIELD OF THE INVENTION

The present invention relates to speech recognition systems and methods, and more particularly, to training acoustic models for speech recognition engines.

BACKGROUND OF THE INVENTION

Figure 8:
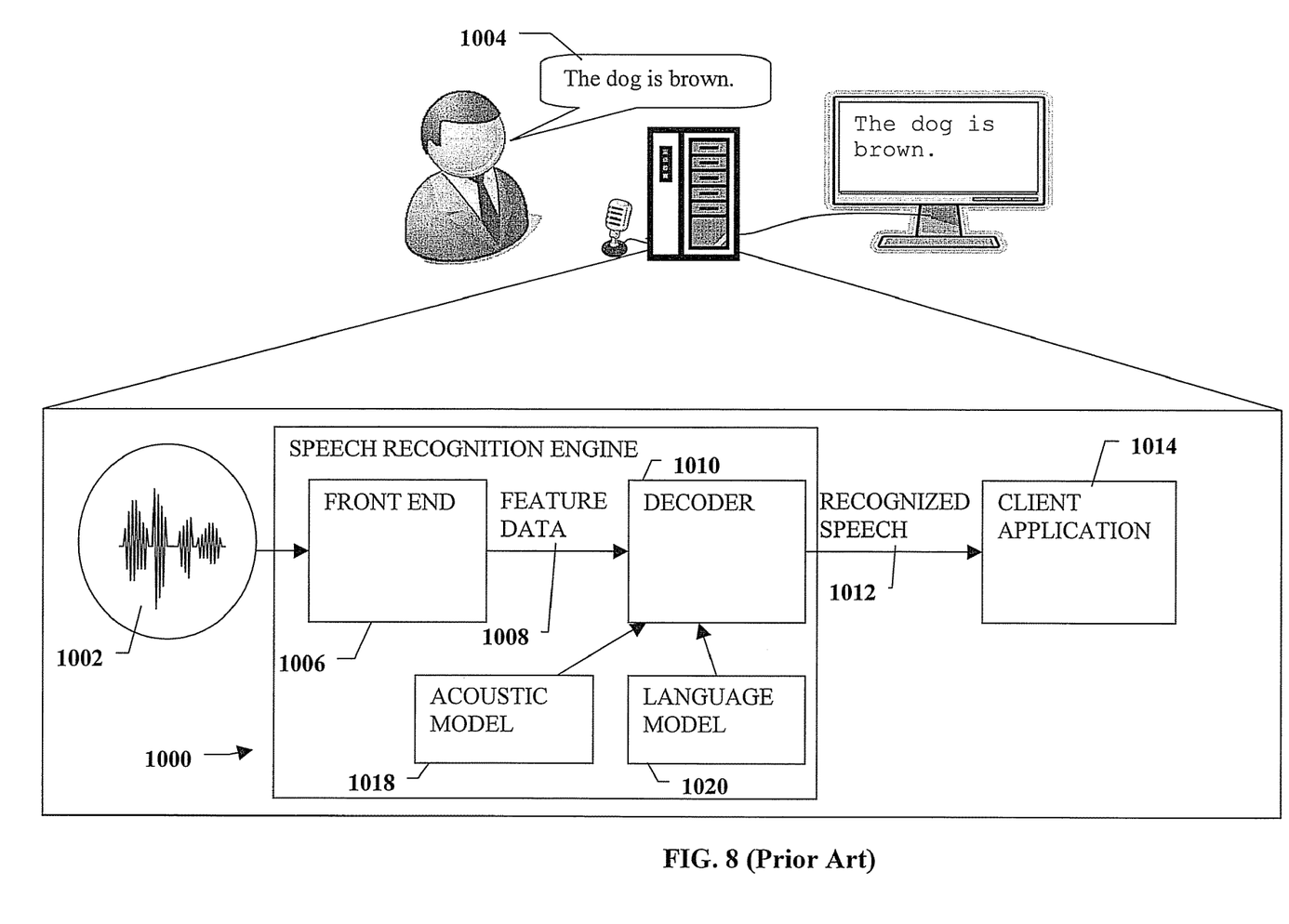
FIG. 8 is a schematic overview of a typical speech recognition engine.

Referring to FIG. 8, in a typical speech recognition engine 1000, a signal 1002 corresponding to speech 1004 is fed into a front end module 1006. The front end 1006 module extracts feature data 1008 from the signal 1002. The feature data 1008 is input to a decoder 1010, which the decoder 1010 outputs as recognized speech 1012. The recognized speech 1012 is then available as an input to an application 1014.

An acoustic model 1018 and a language model 1020 also supply inputs to the decoder 1010. Generally, the acoustic model 1018, also called a voice model, identifies to which phonemes the feature data 1008 most likely correlate. The language model 1020 consists of the certain context dependent text elements, such as words, phrases and sentences, based on assumptions about what a user is likely to say. The language model 1020 cooperates with the acoustic model 1018 to assist the decoder 1010 in further constraining the possible options for the recognized speech 1012.

Figure 9:
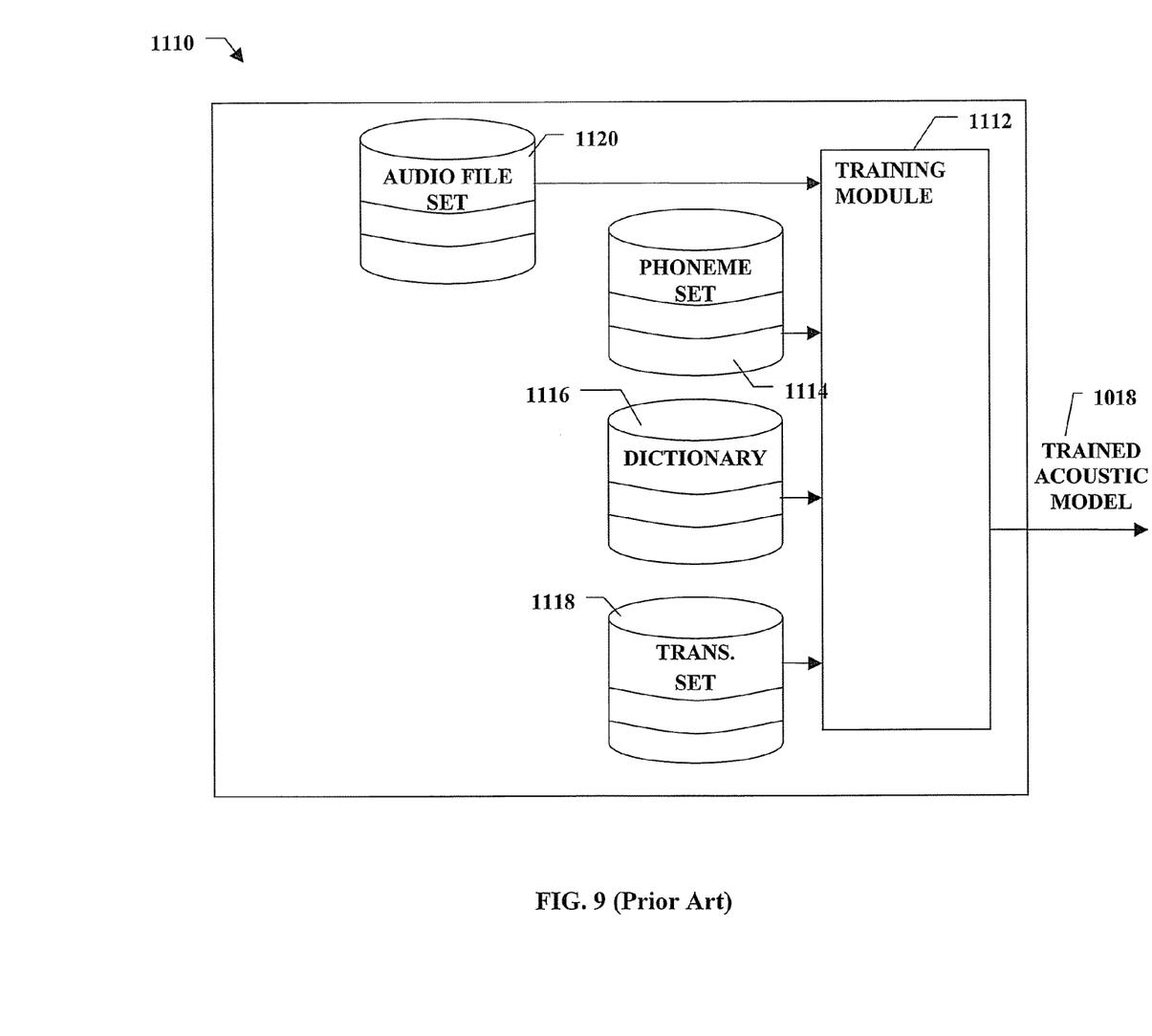
FIG. 9 is a schematic overview of a typical acoustic model training system.

Referring to FIG. 9, by methods known in the art, the acoustic model 1018 is trained by training system 1110. The training system 1110 includes a training module 1112 using a phoneme set 1114, a dictionary 1116 and a training data set. The dictionary includes a plurality of text elements, such as words and/or phrases, and their phonetic spellings using phonemes from the phoneme set. The training data set include an audio file set 1118 including a plurality of audio files, such as wave files of recorded speech, and a transcription set 1120 including a plurality of transcriptions corresponding to the recorded speech in the audio files. Typically, the transcriptions are grouped into a single transcription file including a plurality of lines of transcribed text, each line of transcribed text including the name of the corresponding audio file.

In practice, the textual content of the training data set, represented by the transcriptions, is generally selected to cover a wide range of related applications. The resultant acoustic model can then be "shared" by all the related applications. While this approach saves the expense of training a separate acoustic model for individual applications there is a corresponding loss in accuracy for the individual applications.

SUMMARY OF THE INVENTION

In view of the foregoing, it is an object of the present invention to provide an improved system and method for training an acoustic model. According to an embodiment of the present invention, an acoustic model training system includes a combined phoneme set with renamed specific phonemes, a combined dictionary with renamed specific text elements and corresponding renamed phonetic spellings, an audio file set, a combined transcription set corresponding to the audio file set and including transcriptions with renamed specific text elements, and a training module configured to train the acoustic model based on the audio file set, the combined transcription set, the combined phoneme set and the combined dictionary.

According to a method aspect of the present invention, a method of training an acoustic model includes generating a specific text element set as a subset of a general text element set corresponding to a text data set. A combined phoneme set and a combined dictionary are also generated. The combined phoneme set includes renamed specific phonemes corresponding to the specific text element set and the combined dictionary includes the specific text element set with phonetic spellings using the renamed specific phonemes. A combined transcription set is additionally generated, the combined transcription set includes transcriptions with specific text elements from the specific text element set. The acoustic model is trained using the specific phonetic element set, the specific dictionary, the specific transcription set and an audio file set.

According to another aspect of the present invention, the text data set is not limited to text data from a training data set for the acoustic model, and can include text data from additional and/or alternate texts. According to a further aspect of the present invention, the specific text element set includes the most frequently occurring text elements from the text data set. The most frequently occurring text elements can be identified using a text element distribution table sorted by occurrence within the text data set, or by other methods. According to another aspect of the present invention, specific phonemes can be limited to consonant phonemes.

Thus, the present invention reduces feature space variation associated with specific text elements by training an acoustic model with a phoneme set, dictionary and transcription set configured to better distinguish the specific text elements and at least some specific phonemes associated therewith. These and other objects, aspects and advantages of the present invention will be better appreciated in view of the following detailed description of a preferred embodiment and accompanying drawings.

DETAILED DESCRIPTION OF A PREFERRED EMBODIMENT

Figure 1:
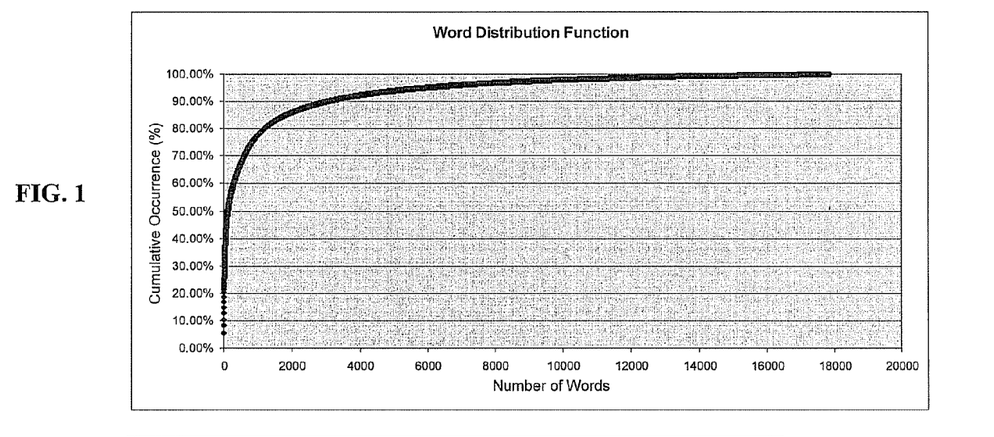
FIG. 1 is a plot of word distribution in a sample text data set.

Referring to FIG. 1, word distribution in a sample text data set is presented. The sample text data set includes 17,846 words with 1,056,134 tokens. A "token" is any occurrence of a text element (in this example, a word) within the text data set, regardless of whether the text element has occurred before. For instance, the word "the" might occur 83,000 times in the text data set. Thus, the word "the" contributes 83,000 tokens to the text data set.

In FIG. 1, the x-axis represents the words in the sample text data set sorted into a distribution table from most frequently occurring to least frequently occurring. Thus, the first word in the table is the most frequently occurring and the $17,846^{th}$ word in the table is the least frequently occurring. The y-axis represents the cumulative occurrences of the words, as a percentage of the total number of tokens in the text data set. Thus, if the first word contributes 6% of the tokens and the second word contributes 4% of the tokens, the cumulative occurrence of the first word is 6%, the cumulative occurrence of the first two words is 10%, and so on. The cumulative occurrence of all 17,846 words is 100%.

It will be appreciated from FIG. 1 that a relatively small minority of words contributes a substantial majority of the tokens. The top 120 words, only 0.7% of the 17,846 total words, have a cumulative occurrence of approximately 50%. The top 1185 words, only 2.2% of the 17,846 total words, have a cumulative occurrence of approximately 80%. While these percentages will vary between text data sets, a text element distribution table for a given text data set will typically reveal that a small percentage of the total number of text elements contributes a large percentage of the total number of tokens.

Existing acoustic model training does not adequately differentiate between more and less frequently occurring text elements, such as words, in a data set. Because the same phoneme set is used for all text elements, the variation in feature space for infrequently occurring text elements can adversely affect the variation in feature space for the most frequently occurring text elements. By effectively differentiating specific text elements during acoustic model training, the recognition error rate for those specific text elements can be significantly reduced. Moreover, if the specific text elements are selected from among the most frequently occurring text elements in the text data set, the overall accuracy of the speech recognition engine can be increased significantly.

Figure 2:
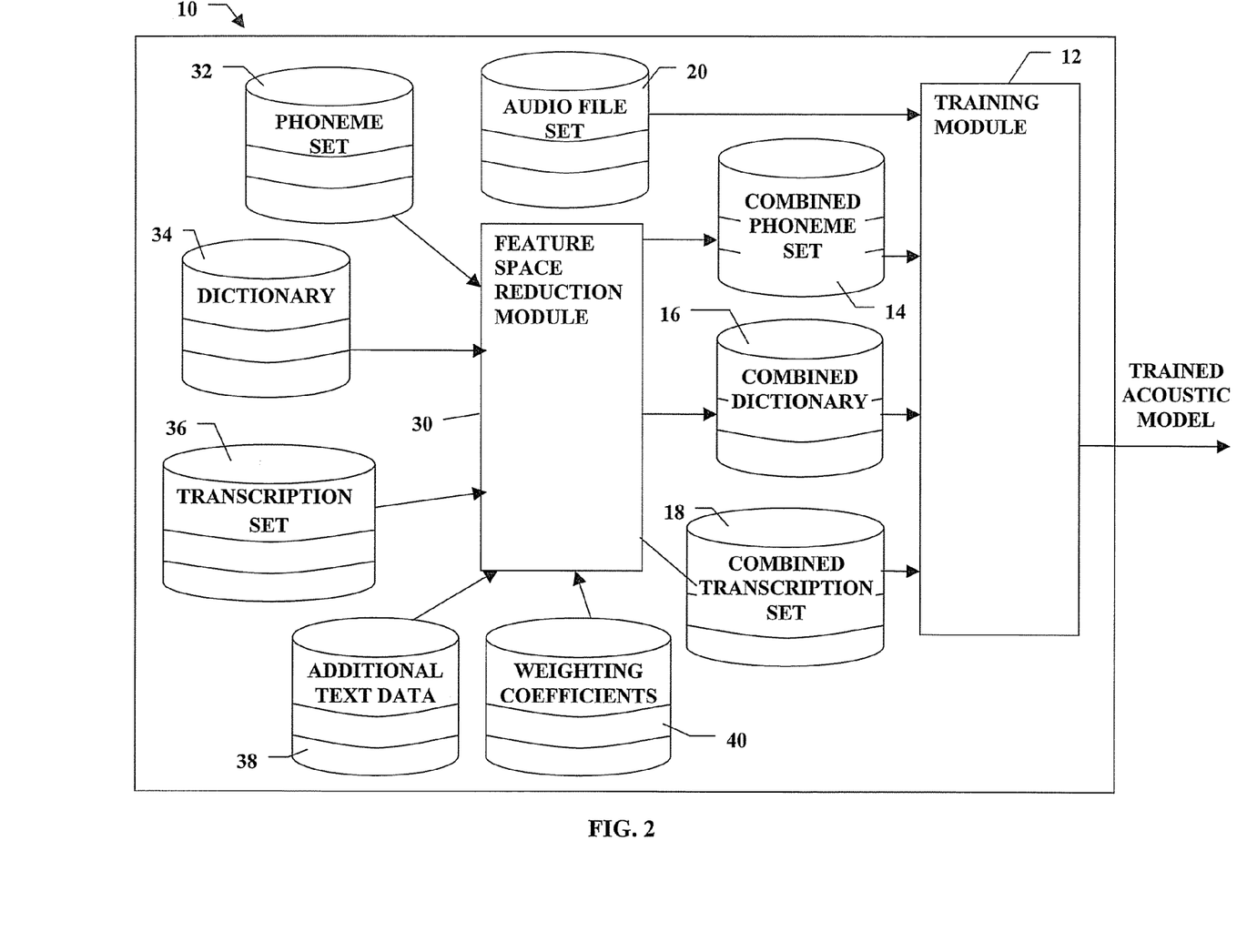
FIG. 2 is a schematic overview of a system for acoustic model training, according to an embodiment of the present invention.

Referring to FIG. 2, according to another embodiment of the present invention, an acoustic model training system 10 includes a training module 12 that receives inputs from a combined phoneme set 14, a combined dictionary 16, a combined transcription set 18 and an audio file set 20. The system 10 further includes a feature space reduction module 30 that generates the combined phoneme set 14, combined dictionary 16, and combined transcription set 18 based on inputs from an ordinate phoneme set 32, a general dictionary 34 and a general transcription set 36. The feature space reduction module 30 can also accept inputs of additional text data 38 and weighting coefficients 40.

It will be appreciated that speech recognition engines are inherently machine processor-based. Accordingly, the systems and methods herein are realized by at least one processor executing machine-readable code and that inputs to and outputs of the system or method are stored, at least temporarily, in some form of machine-readable memory. However, the present invention is not necessarily limited to particular processor types, numbers or designs, to particular code formats or languages, or to particular hardware or software memory media.

The combined phoneme set 14 includes ordinate phonemes and renamed specific phonemes. The renamed specific phonemes advantageously correspond to specific text elements selected from frequently used text elements in a text data set. The text data set can include, for example, the text data from the transcription set and/or the additional text data. Advantageously, the renamed specific phonemes correspond to only a portion of the phonemes required to phonetically spell the specific text elements. For example, the renamed specific phonemes can include only phonemes corresponding to consonants.

The combined dictionary 16 includes all the text elements in the training data set and renamed specific text elements corresponding to the specific text elements. The combined dictionary 16 further includes phonetic spellings for all the text elements therein. The spellings for the renamed specific text elements include the renamed specific phonemes. It will be appreciated that the spellings for the specific text elements can also include some ordinate phonemes. For example, if the renamed specific phonemes include only phonemes corresponding to consonants, the vowel phonemes in the spellings for the renamed specific text elements will be ordinate phonemes.

The combined transcription set 18 includes transcriptions of the recorded speech in the audio file set, including transcriptions having renamed specific text elements therein, as well as transcriptions without any renamed specific text elements. The audio files 20 are listed in an audio file list and the transcriptions are included in a transcription file.

Based on the combined phoneme set 14, combined dictionary 16, combined transcription set 18, and audio file set 20, the training module 12 trains the acoustic model according to various methods known in the art. In connection with acoustic model training, the training module 12 can be configured to identify context-dependent phonemes and sub-phonemes, as well as developing other acoustic model attributes.

Figure 3:
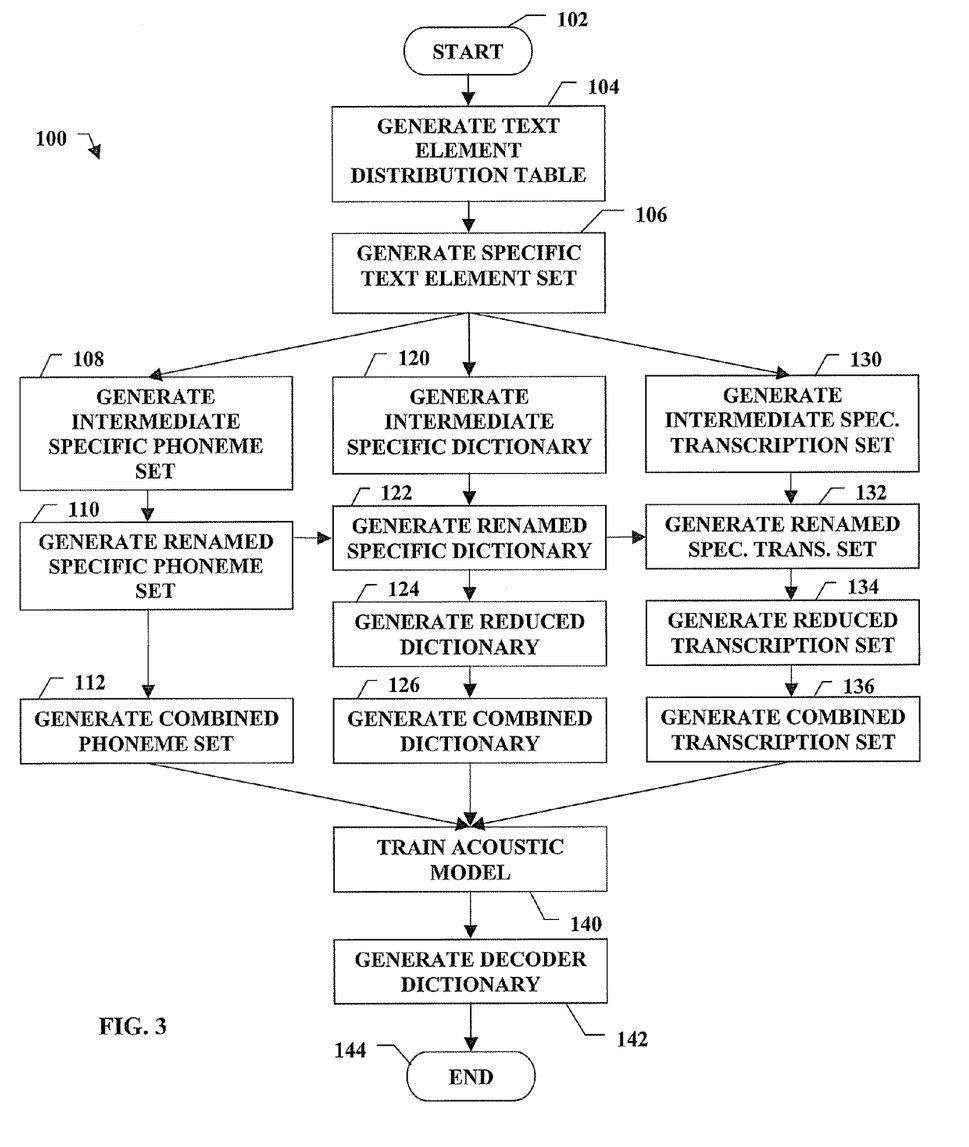
FIG. 3 is a flow diagram of a method of training an acoustic model, according to a method aspect of the present invention.

According to a method aspect of the present invention, referring to FIG. 3, a method 100 for training an acoustic model for a speech recognition engine begins at block 102. At block 104, a text element distribution table is generated from a text data set. The text data set can include, but is not limited to, text data from the transcriptions in a training data set for the acoustic model. The text data set can also include text data from alternate or additional texts.

The distribution table is generated by determining the occurrences of each text element within the training data set and sorting the text elements by the occurrence. Advantageously, the cumulative occurrence of the text elements is also determined, beginning from the most frequently occurring text element in distribution the table.

Figure 4:
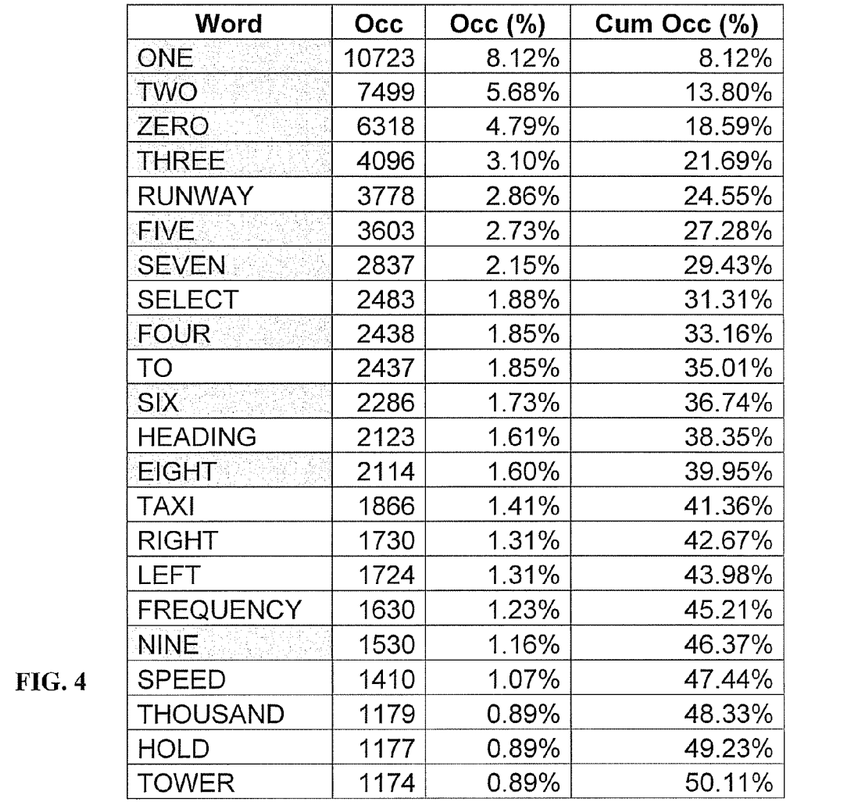
FIG. 4 is a portion of an exemplary word distribution table for use in connection with the method of FIG. 3.

Referring to FIG. 4, a portion of an exemplary distribution table is presented, in which the top 22 words are shown from a text data set with 1056 words and 132,008 tokens. In this example, the top 22 words, 2.1% of the total number of words, have a cumulative occurrence of 50.11%. The ten words for single digit numbers (e.g., zero, one, two, etc.—shaded in the FIG. 4) have a cumulative occurrence of 32.91%.

Referring again to FIG. 3, at block 106, a specific text element set ($TE_s$) is generated. $TE_s$ is a subset of a general text element set ($TE_1$), such as all the words in the text data set. For example, $TE_s$ includes the ten words for single digit numbers from $TE_1$, where $TE_1$ includes all 1056 words. Advantageously, $TE_s$ is selected to include a low number of the most frequently occurring text elements whose spellings require only a small number of phonemes.

Figure 5:
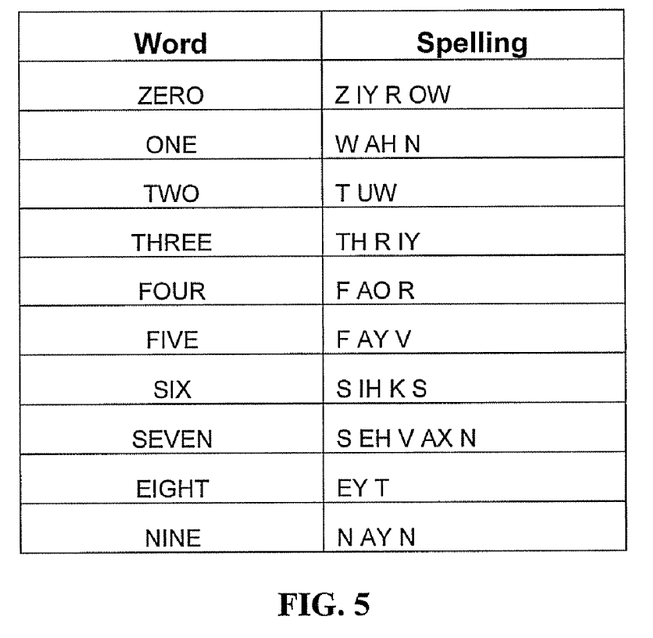
FIG. 5 is a portion of an exemplary dictionary for use in connection with the method of FIG. 3.
Figure 6:
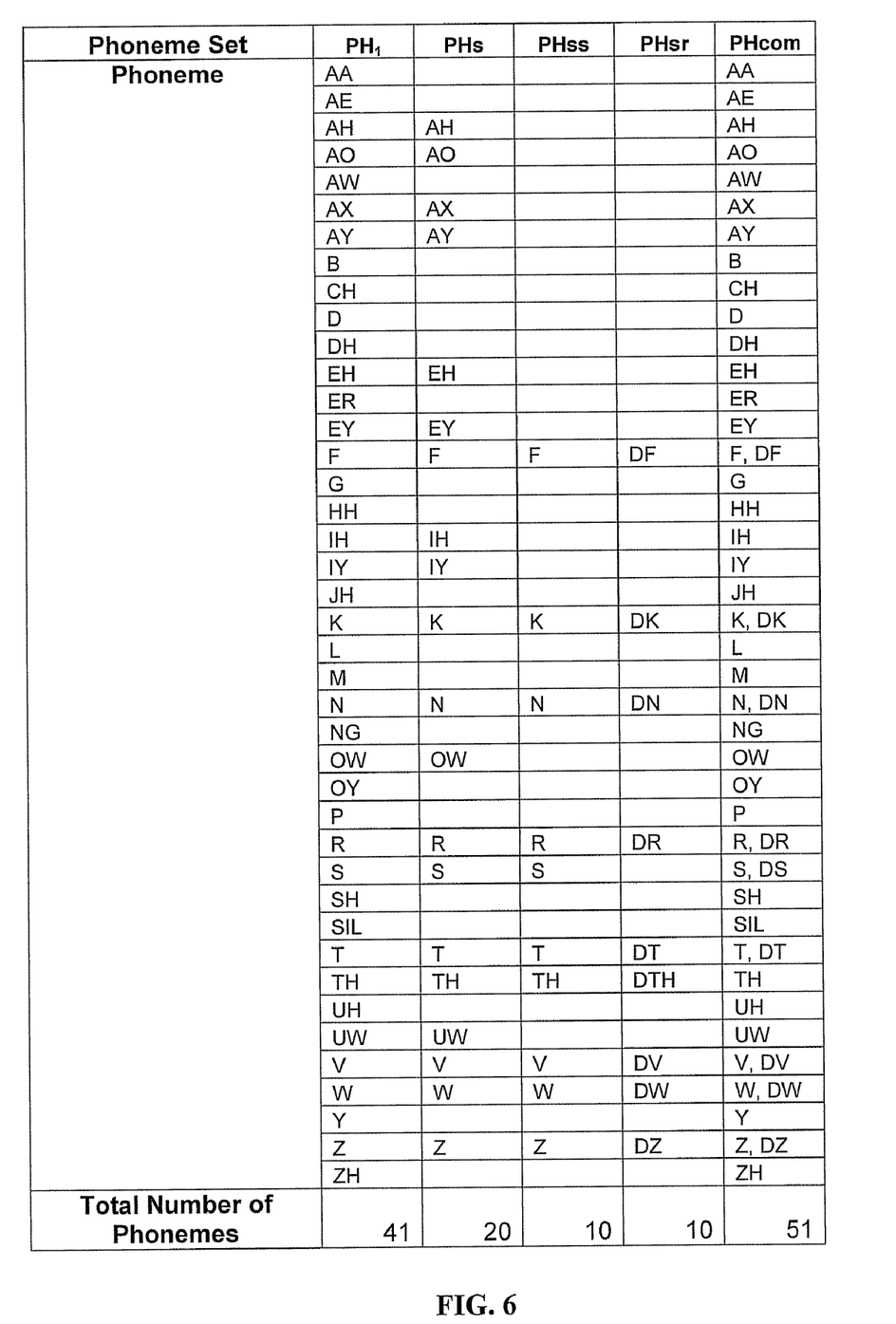
FIG. 6 is a chart of phoneme sets for use in connection with the method of FIG. 3.

At block 108, an intermediate specific phoneme ($PH_s$) set is generated. $PH_s$ is a subset of an ordinate phoneme set ($PH_1$) and includes only those phonemes needed for phonetic spellings of the text elements in $TE_s$. The phonetic spellings of the text elements in $TE_s$ are determined from a general dictionary ($DICT_1$), including $TE_1$ and the corresponding phonetic spellings. An example of $DICT_1$ entries for the single digit numbers is seen in FIG. 5. Referring to FIG. 6, in the current example, $PH_1$ includes 41 ordinate phonemes, of which only 20 are required for $PH_s$.

The present applicant has determined that consonant phonemes are particularly significant to speech recognition accuracy. Advantageously, the size of $PH_s$ is further reduced by selecting only phonemes from $PH_s$ for consonants to generate a further intermediate specific phoneme set ($PH_{ss}$). From FIG. 6, it will be appreciated that $PH_{ss}$ used only 10 phonemes from $PH_s$.

Referring again to FIG. 3, at block 110, a renamed specific phoneme set $PH_{sr}$ is generated. $PH_{sr}$ is generated by assigning a unique, new name to each phoneme in $PH_{ss}$. For example, the "B" phoneme is renamed "DB", which new name does not occur elsewhere in $PH_1$ or $PH_{sr}$. At block 112, a combined phoneme set ($PH_{com}$) is generated by combining $PH_1$ and $PH_{sr}$. Referring again to FIG. 6, $PH_{com}$ includes 51 phonemes; the 41 ordinate phonemes from $PH_1$ and 10 renamed specific phonemes from $PH_{sr}$.

Figure 7:
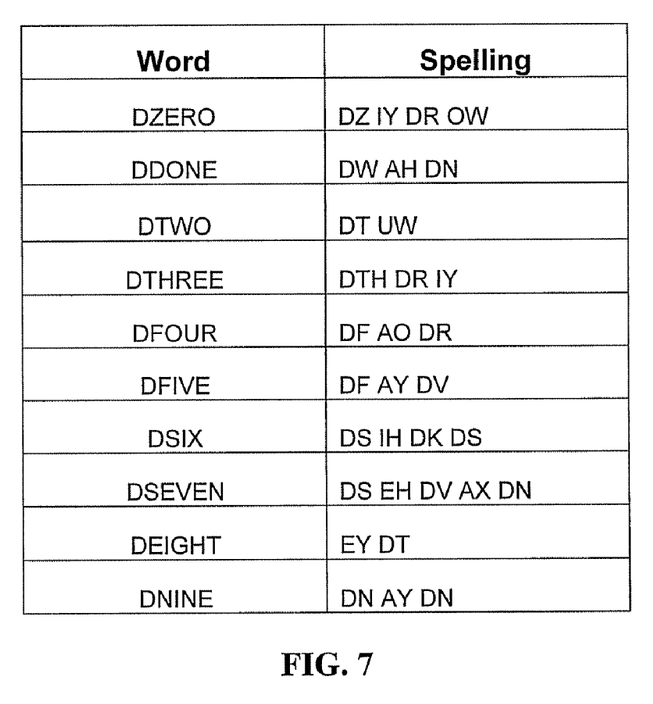
FIG. 7 is a portion of another exemplary dictionary for use in connection with the method of FIG. 3.

Referring again to FIG. 3, at block 120, an intermediate specific dictionary ($DICT_s$) is generated. $DICT_s$ is a subset of $DICT_1$ including only the text elements from $TE_s$ and the corresponding phonetic spellings. Thus, in the current example, $DICT_s$ includes only those entries of $DICT_1$ seen in FIG. 5. Referring again to FIG. 3, at block 122, a renamed specific dictionary ($DICT_{sr}$) is generated. $DICT_{sr}$ is generated by using renamed specific phonemes from $PH_{sr}$ to replace ordinate phonemes in the $DICT_s$ spellings and by renaming each of the text elements from $DICT_s$ with a unique, new name. For example, "ONE" is renamed "DDONE", which new name does not occur elsewhere in $DICT_1$ or $DICT_{sr}$. The $DICT_{sr}$ entries for the current example are seen in FIG. 7.

Referring again to FIG. 3, at block 124, a reduced dictionary ($DICT_{1r}$) is generated. $DICT_{1r}$ is generated by removing the $DICT_s$ text elements and the corresponding spellings from $DICT_1$. At block 126, a combined dictionary $DICT_{com}$ is generated. The combined dictionary is generated from $DICT_{1r}$ and $DICT_{sr}$, and can also include $DICT_s$, as follows:

$DICT_{com} = DICT_{1r} + DICT_{sr} + (\delta \times DICT_S)$; where $\delta = 1$ or 0.

If $\delta=0$, the $TE_s$ text elements will only be represented in $DICT_{com}$ by the $DICT_{sr}$ entries during subsequent acoustic model training, but if $\delta=1$ the $TE_s$ text elements will be represented by both the $DICT_{sr}$ and $DICT_s$ entries.

At block 130, an intermediate specific transcription set ($TRANS_s$) is generated. $TRANS_s$ is a subset of a general transcription set ($TRANS_1$), including only transcriptions having one or more text elements from $TE_s$. The transcriptions of $TRANS_1$ correspond to the recorded speech in a plurality of audio files in a general audio file list ($AUD_1$).

At block 132, a renamed specific transcription set ($TRANS_{sr}$) is generated. $TRANS_{sr}$ is generated by renaming the text elements from $TE_s$ in $TRANS_s$ with the corresponding new, unique names from $DICT_{sr}$. At block 134, a reduced transcription set ($TRANS_{1r}$) is generated. $TRANS_{1r}$ is generated by removing the $TRANS_s$ transcriptions from $TRANS_{1r}$. At block 136, a combined transcription set ($TRANS_{com}$) is generated. $TRANS_{com}$ is generated by combining $TRANS_{1r}$ and $TRANS_{sr}$, and can also include $TRANS_s$, as follows:

$TRANS_{com} = (\lambda_1 \times TRANS_{1r}) + (\lambda_2 \times TRANS_{sr}) + (\lambda_3 \times TRANS_s)$;

where $\lambda_1$, $\lambda_2$ and $\lambda_3$ are weighting coefficients, and $\lambda_1$ and $\lambda_2$ can be 1, 2, ..., N and $\lambda_3$ can be 0, 1, ..., M. However, $\lambda_3$ should be 0 only if $\delta=0$.

Once $TRANS_{com}$ is generated, $AUD_1$ should be updated to reflect the transcriptions in $TRANS_{com}$. The training of the acoustic model (block 140) can then be performed using $PH_{com}$, $DICT_{com}$, $TRANS_{com}$ and the audio files in the updated list ($AUD_2$).

At block 142, the method can further include generating a dictionary for the decoder ($DICT_{dec}$) of the speech recognition engine. Generating $DICT_{dec}$ includes removing the renamed text elements from $DICT_{com}$. If $DICT_{com}$ does not include the unrenamed specific text elements (e.g., if $\delta=0$), then the unrenamed specific text elements are substituted for the renamed specific text elements in the $DICT_{dec}$ entries. In addition to the spelling with renamed specific phonemes, the entry for each specific text element in $DICT_{dec}$ is supplemented with the spelling using only ordinate phonemes. If $DICT_{com}$ includes the specific text elements with their original names and spellings (e.g., if $\delta=1$), then the renamed spellings from $DICT_{com}$ are associated with the entries of specific text elements as an alternate spelling for the $DICT_{dec}$ entries.

In either case (e.g., $\delta=0$ or $\delta=1$), each of the resulting entries in $DICT_{dec}$ for the specific text elements includes the unrenamed specific text element, the spelling with only ordinate phonemes and the spelling that includes renamed specific phonemes. For example, using the spellings for "ONE" and "DDONE" of the current example (see FIGS. 5 and 7), the entry for "ONE" in $DICT_{dec}$ would include:

| ONE | (1) W AH N |
|-----|------------|
|     | (2) DW AH DN |

The method 100 ends at block 144, although the method can be repeated as desired or required to further optimize the acoustic model. In particular, the contents of $TE_s$ and $PH_{ss}$, and the values of $\delta$, $\lambda_1$, $\lambda_2$ and $\lambda_3$, can be varied to optimize the accuracy of the acoustic model.

For instance, by setting $\delta=0$, the ordinate phonemes may be more completely isolated from the renamed specific phonemes. However, this can eliminate a large amount of the available audio data used to determine feature space for the remaining general text elements and ordinate phonemes during acoustic model training, which may reduce recognition accuracy for the remaining general text elements. Depending on the size of the training data set, it may be advantageous to increase the audio data available for ordinate phonemes by setting $\delta=1$ and further adjusting $\lambda_1$, $\lambda_2$ and $\lambda_3$. In this way, the audio data associated with the specific text elements and specific phonemes can still be utilized in determining the feature space for the remaining general text elements and their ordinate phonemes.

Additionally, it will be appreciated that all the method steps enumerated above are not necessary for every execution of the method 100 for training an acoustic model. Also, the steps are not necessarily limited to the sequence described, and many steps can be performed in other orders, in parallel, or iteratively. Moreover, the present invention can be employed for the initial training of an acoustic model, as well as for re-training a previously trained acoustic model.

Also, while it is advantageous to form the specific text element set from the most frequently occurring text elements in the data set based on a text distribution table, the present invention is not necessarily limited to a particular mechanism for identifying the most frequently occurring text elements, or to selecting only the most frequently occurring text elements. For example, the specific text element set could include text elements that occur less frequently but are critical to the success or safety of a particular application.

From the foregoing, it will be appreciated that aspects of the present invention allow several improvements to acoustic model training, and correspondingly, to the accuracy of the speech recognition engines. For instance, the present invention allows improved isolation of the feature space for specific text elements from the remaining text elements. Additionally, while permitting this improved isolation, the present invention still allows acoustic data associated with tokens of the specific phonemes and specific text elements to contribute to the development of feature space for ordinate phonemes and the remaining text elements. Moreover, the present invention allows a reduction in the number of renamed specific phonemes, thus reducing the size of the combined phoneme set used to train the acoustic model, while still generally increasing both speed and accuracy.

Furthermore, the present invention provides an effective method for selecting the most frequently occurring specific text elements from a text data set, which can include use of a text distribution table. By allowing text data from additional texts beyond those of the training data set to be considered when determining text element occurrence, the present invention can allow for more accurate identification of the text elements most frequently used in a given application.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A method of training an acoustic model, the method comprising:
   generating a specific text element set as a subset of a general text element set;
   generating a combined phoneme set, the combined phoneme set including ordinate phonemes occurring in the general text element set and renamed specific phonemes corresponding to at least some of the ordinate phonemes occurring in the specific text element set;
   generating a combined dictionary, the combined dictionary including text elements from the general text element set outside the specific text element set with phonetic spellings including the ordinate phonemes and renamed specific text elements from the specific text element set with phonetic spellings including the renamed specific phonemes;
   generating a combined transcription set, the combined transcription set including transcriptions with the text elements from the general text element set outside the specific text element set and the renamed specific text elements; and
   training the acoustic model using the combined phoneme set, the combined dictionary, the combined transcription set and an audio file set.

2. The method of claim 1, wherein the specific text element set is at least one of a specific word set or a specific phrase set.

3. The method of claim 1, wherein the renamed specific phonemes include only phonemes corresponding to consonants.

4. The method of claim 1, further comprising generating a text element distribution table, the distribution table including the general text element set sorted by occurrence within a text data set.

5. The method of claim 4, wherein generating the specific text element set includes selecting specific text elements from the distribution table based on frequency of occurrence within the text data set.

6. The method of claim 4, wherein selecting specific text elements from the distribution table based on frequency of occurrence includes selecting a minimum number of specific text elements sufficient to contribute a predetermined cumulative occurrence within the text data set.

7. The method of claim 4, wherein the text data set includes text data from texts different than the transcriptions.

8. The method of claim 1, wherein generating the combined phoneme set includes generating an intermediate specific phoneme set, the intermediate specific phoneme set including specific phonemes, the specific phonemes including only the ordinate phonemes needed for phonetic spellings of the specific text element set.

9. The method of claim 8, wherein only the specific phonemes corresponding to consonants are retained in the intermediate specific phoneme set.

10. The method of claim 8, wherein generating the combined phoneme set further includes generating a renamed specific phoneme set by renaming the specific phonemes with unique, new names.

11. The method of claim 10, wherein generating the combined phoneme set further includes combining the renamed specific phoneme set with the ordinate phonemes.

12. The method of claim 1, wherein generating the combined dictionary includes generating an intermediate specific dictionary by selecting, from a general dictionary, only specific text elements from the specific text element set and corresponding phonetic spellings.

13. The method of claim 12, wherein generating the combined dictionary further includes generating a renamed specific dictionary by renaming the specific text elements with unique new, names and respelling the renamed specific text elements with the renamed specific phonemes.

14. The method of claim 12, wherein generating the combined dictionary further includes generating a reduced dictionary by removing the specific text elements and the corresponding phonetic spellings from the general dictionary, and combining the reduced dictionary and the renamed specific dictionary.

15. The method of claim 14, wherein generating the combined dictionary further includes selectively combining the reduced dictionary and the renamed specific dictionary with the intermediate specific dictionary.

16. The method of claim 1, wherein generating the combined transcription set includes generating an intermediate specific transcription set including only those transcriptions from a general transcription set that include at least one specific text element from the specific text element set.

17. The method of claim 16, wherein generating the combined transcription set further includes generating a renamed specific transcription set by replacing the specific text elements with the renamed specific text elements.

18. The method of claim 17, wherein generating the combined transcription set further includes generating a reduced transcription set by removing the transcriptions of the intermediate specific transcription set from the general transcription set, and combining at least the reduced transcription set and the renamed specific transcription set.

19. The method of claim 18, wherein generating the combined transcription set further includes selectively combining the reduced transcription set and the renamed specific transcription set with the intermediate specific transcription set.

20. The method of claim 19, wherein selectively combining the reduced transcription set and the renamed specific transcription set with the intermediate specific transcription set further includes applying weighting coefficients to each transcription set.

21. An acoustic model training system comprising at least one processor and machine readable memory configured to execute:
- a combined phoneme set including ordinate phonemes and renamed specific phonemes, the renamed specific phonemes corresponding to at least some of the ordinate phonemes;
- a combined dictionary including renamed specific text elements with corresponding phonetic spellings using the renamed specific phonemes and unrenamed text elements with corresponding spellings using the ordinate phonemes;
- an audio file set;
- a combined transcription set corresponding to the audio file set and including transcriptions with the renamed specific text elements; and
- a training module configured to train the acoustic model based on the audio file set, the combined transcription set, the combined phoneme set and the combined dictionary.

22. The system of claim 21, wherein the combined transcription set further includes transcriptions without any renamed specific text elements.

23. A method of training an acoustic model, the method comprising:
- generating a specific word set based on frequency of occurrence within a text data set;
- generating a phoneme set including renamed specific phonemes used in phonetic spellings of the specific word set;
- generating a dictionary including renamed specific words of the specific word set with phonetic spellings including the renamed specific phonemes;
- generating a transcription set including transcriptions having the renamed specific words therein; and
- training the acoustic model based on the phoneme set, the dictionary, the transcription set and an audio file set;
- wherein generating the dictionary and the transcription set include selectively including unrenamed specific words with phonetic spellings without renamed specific phonemes.

24. The method of claim 23, wherein the text data set differs from a training data set for the acoustic model.

25. The method of claim 23, wherein the renamed specific phonemes include only phonemes corresponding to consonants.

26. The method of claim 23, wherein selectively including unrenamed specific words with phonetic spellings without renamed specific phonemes includes setting weighting coefficients to determine a relative contribution of the unrenamed specific words.

* * * * *